US006692256B2

(12) United States Patent
Chan et al.

(10) Patent No.: US 6,692,256 B2
(45) Date of Patent: Feb. 17, 2004

(54) INTERACTIVE TUTORIAL (75) Inventors: Kevin Chan, Scarborough (CA); Wassim Melhem, Toronto (CA); Dirk Alexander Seelemann, Thornhill (CA); Vito Spatafora, Richmond Hill (CA); Michael Starkey, Vancouver (CA)

(73) Assignee: International Business Machines Corporation, Armonk, NY (US)

( * ) Notice: Subject to any disclaimer, the term of this patent is extended or adjusted under 35 U.S.C. 154(b) by 68 days.

(21) Appl. No.: 09/730,976

(22) Filed: Dec. 6, 2000

(65) Prior Publication Data

US 2002/0168616 A1 Nov. 14, 2002

(30) Foreign Application Priority Data

Sep. 7, 2000  (CA) .............................................. 2317825

(51) Int. Cl.[7] .............................................. G09B 19/00
(52) U.S. Cl. ....................... 434/118; 434/350; 434/323; 717/108
(58) Field of Search ........................... 434/118; 717/108, 717/109, 135; 703/22

(56) References Cited

U.S. PATENT DOCUMENTS 6,314,960 B1 * 11/2001 Vines ......................... 434/322
6,330,426 B2 * 12/2001 Brown et al. ................ 434/307
6,347,943 B1 *  2/2002 Fields et al. ................. 434/118
RE37,723 E    *  6/2002 Goren ......................... 345/2.1
6,413,100 B1 *  7/2002 Dickmeyer et al. ......... 434/118
6,418,298 B1 *  7/2002 Sonnenfeld .................. 434/118
6,427,063 B1 *  7/2002 Cook et al. .................. 434/350

OTHER PUBLICATIONS

Educase Press Release, Oct. 1, 2002, XYTHOS Software Shows Off New Technology Solutions At Educase, www.xythos,com/home/xythos/news_38.html.*

* cited by examiner

Primary Examiner—S. Thomas Hughes
Assistant Examiner—John Sotomayor
(74) Attorney, Agent, or Firm—Edward H. Duffield; John D. Flynn

(57) ABSTRACT

The invention pertains to a computer tutorial system wherein software product training is provided interactively by guiding the user, for example, through one or more examples or applications that can be created in and/or using the product. More particularly, the invention involves a computer implemented, interactive tutorial system providing online instruction in conjunction with a contemporaneously operating software product to, for example, create such examples or applications and the tutorial system further providing for the creation of such examples or applications in and/or using the product.

21 Claims, 8 Drawing Sheets

INTERACTIVE TUTORIAL

FIELD OF THE INVENTION

The present invention relates generally to tutorial systems for providing instruction in the operation of software products. Particularly, the invention pertains to a computer tutorial system wherein software product training is provided interactively by guiding the user, for example, through one or more examples or applications that can be created in and using the product. More particularly, the invention involves a computer implemented, interactive tutorial system providing online instruction in conjunction with a contemporaneously operating software product to, for example, create such examples or applications and the tutorial system further providing for the creation of such applications and examples in and using the product.

BACKGROUND OF THE INVENTION

As software developers strive to provide ever more versatile and powerful products, the task of becoming proficient in the use and implementation of such products becomes increasingly difficult. Even for those users who consider themselves computer "literate", days and sometimes weeks of instruction may be required before the user is able to take full advantage of functional capabilities offered by many software products. In such cases, the quality of the instructional materials accompanying the software may be nearly as important as the product in ensuring ultimate user satisfaction.

Software instructional materials for prior art products fall into two general types. On one hand are product documentation materials, such as printed manuals and online product description files. These materials provide textual descriptions of operational features of the product. They may also include examples of product operations as well as example applications that can be created in and using the product. Although documentation of this nature may be adequate for reference purposes, such materials are not particularly suitable for providing initial instruction in the use of a product. Most users would rather use the product directly than spend hours reading ancillary instructional materials. Accordingly, a number of products follow a learn-by-doing approach using interactive tutorial materials, which represent a second category of instructional materials.

Unlike product documentation materials, tutorials provide instruction in a manner which gives the user an opportunity to gain practical experience in the context of solving actual problems. Both online and workbook-based tutorials have been proposed wherein the user is guided through a presentation of one or more examples or problems in a sequence of lessons. In workbook-based systems the student performs specified actions on the product in accordance with a lesson plan set forth in a printed workbook. Online systems work in a similar fashion except that the tutorial lessons are displayed sequentially on-screen. In addition, online tutorials typically include the capability of monitoring student actions and advising when a mistake has been made. Moreover, if the user requires assistance, a preprogrammed demonstration can be requested to show the correct action(s) to be taken. For these reasons, online tutorials represent the most promising avenue for providing instruction in the operation of software products.

Most prior art online tutorial systems allow users to interact with a simulation of the software product of interest. This approach to tutorial instruction is both inefficient and costly. The software designer must not only code and debug the application product itself but also the duplicative simulation code for the tutorial. The simulation code must be periodically updated and maintained as the product changes, all at additional time and cost. The effectiveness of simulation tutorials as a teaching vehicle is also open to question. Simulation tutorials provide only limited product interaction because the simulations can only emulate the user interface of the product and do not have full capabilities in processing user actions. The user is not afforded direct experience with the product and thus may be deprived of a full and accurate understanding of product characteristics. Because only a partial view of the product is provided, users are unable to explore other portions of the product or learn on their own beyond what the tutorial covers.

As a solution to the inefficiencies of simulation tutorials, several systems have been proposed wherein online tutorial instruction proceeds in conjunction with the operation of the product to be taught. The prior art includes interactive tutorials implemented in single task operating systems in which special hardware or software subsystems are required to control the environment and provide tutorial information. This special hardware and software includes such things as interrupts between the user and operating system, processing outside the operating system, and external information presentation hardware. As a result, the flexibility and efficiency of these tutorial products is relatively limited. For example, the information presentation function in many prior art tutorial systems is provided in a strict top down sequence which must be followed in the order set forth. No provision is made for selectively controlling the level of tutorial information detail presented as the student works through the lesson. In other cases, the input monitoring function of prior art tutorial systems is unduly restrictive insofar as literal input response from the student is required. No provision is made for allowing the student to provide input to the computer for performing tasks which are non critical to the product.

While certain of the foregoing disadvantages of prior art tutorial systems have been overcome to some extent by tutorial systems operating on multitasking operating systems using specialized software therefor which in combination allow for multiple processes operating in separate windows as well as interprocess communication (see, e.g., U.S. Pat. No. 5,535,422), a further disadvantage with many software product tutorial systems is that although those systems provide examples or applications along with relevant screen captures (whether static or dynamic) of how to use the product, they don't "walk" the user through the steps of using the product and produce an example or application in the software product that can actually be executed. Part of the problem lies in the fact that most software products do not provide a mechanism for an external process to interact with them dynamically.

Accordingly, there exists a need to provide an online tutorial system that is operable in conjunction with a software product of interest. This need offers a unique opportunity to improve upon prior art tutorial systems by offering characteristics and features not provided by the tutorial systems noted above. It would thus be advantageous to provide an interactive tutorial that can be used to create an example or application using and in the product which would be identical to one that was created by the user independently using the product.

Thus, it is desirable to provide a method, system and computer program product for providing an interactive tutorial that overcomes the foregoing and other disadvantages.

SUMMARY OF THE INVENTION

Accordingly, there is provided a method for providing an interactive tutorial of a software product comprising the steps of presenting tutorial content relating to the software product through a tutorial system; initiating a transfer of data to the software product, the data being associated with the tutorial and defining an application of the software product; transferring the data from the tutorial system to the software product upon the initiation of the data transfer; and processing of the data in the software product to render the application of the software product defined by the data. The above method may further comprise the step of providing a user interactivity element for initiating a transfer of the data and wherein initiating a transfer of the data is caused through activation of the user interactivity element. The user interactivity element may be a push button and activation of the user interactivity element comprises clicking the push button. Further, the method may be provided wherein the step of initiating a transfer of data to the software product comprises loading the data and establishing a connection with the software product. The software product may also comprise a World Wide Web Distributed Authority and Versioning industry standard (WebDAV) server and the connection is according to the WebDAV protocol. The method may also be provided wherein the loading is done by an applet. Also, the method may be provided wherein the step of processing of the data in the software product comprises receipt by the WebDAV server of the data and processing of the data by the WebDAV server for execution of commands and updating of information in the software product. The above methods also may be provided wherein the software product is a software application development product and the data defines a software application developed in the software application development product. And, the methods may further comprise the step of configuring the tutorial content based on information in the software product through data transfer to the tutorial system.

Further there is provided a program storage device, tangibly embodying computer readable program code, for causing a computer to perform the method steps of any one of claims 1 to 9.

There is also provided a computer program product comprising computer readable program code means therein for providing an interactive tutorial of a software product, the computer readable program code means in said computer program product comprising computer readable code means for presenting tutorial content relating to the software product through a tutorial system; computer readable code means for initiating a transfer of data to the software product, the data being associated with the tutorial and defining an application of the software product; computer readable code means for transferring the data from the tutorial system to the software product upon the initiation of the data transfer; and computer readable code means for processing of the data in the software product to render the application of the software product defined by the data. The computer program product may further comprise computer readable code means for providing a user interactivity element for initiating a transfer of the data and wherein the computer readable code means for initiating a transfer of the data is started through activation of the user interactivity element. The user interactivity element may also be a push button and activation of the user interactivity element comprises clicking the push button. The computer readable code means for initiating a transfer of data to the software product may also comprise computer readable code means for loading the data and establishing a connection with the software product. The computer program product may also be provided wherein the software product comprises a WebDAV server and the connection is according to the WebDAV protocol. Further, the loading may be done by an applet. Also, the computer program product may be provided wherein the computer readable code means for processing of the data in the software product comprises computer readable code means for receipt by the WebDAV server of the data and computer readable code means for processing of the data by the WebDAV server for execution of commands and updating of information in the software product. The above computer program product may also be provided wherein the software product is a software application development product and the data defines a software application developed in the software application development product. And, the foregoing computer program product may further comprise computer readable code means for configuring the tutorial content based on information in the software product through data transfer to the tutorial system.

There is further provided a computer system for providing an interactive tutorial of a software product comprising means for presenting tutorial content relating to the software product through a tutorial system; means for initiating a transfer of data to the software product, the data being associated with the tutorial and defining an application of the software product; means for transferring the data from the tutorial system to the software product upon the initiation of the data transfer; and means for processing of the data in the software product to render the application of the software product defined by the data. The computer system above may also be provided wherein the means for initiating a transfer of data to the software product comprises means for loading the data and establishing a connection with the software product. The computer system may also be provided wherein the software product comprises a WebDAV server, the loading is done by an applet and the connection is according to the WebDAV protocol.

And, there is provided a computer implemented interactive tutorial for a software product comprising a browser presenting a tutorial page pertaining to the software product; and a data transfer element to transfer to the software product data related to the tutorial page and defining an application within the software product, the data being processed by the software product to generate the application. The interactive tutorial above may also be provided wherein the software product comprises a repository to store information associated with the application; a views mechanism to present information through a user interface corresponding to the information in the repository and for facilitating updating information in the repository through the user interface; and a WebDAV server to communicate with the browser, to process the data for execution of commands in the software are product and to update the information in the repository. Additionally, the interactive tutorial may be provided wherein the data transfer element is an applet and the data is transferred to the WebDAV server according to the WebDAV protocol. The interactive tutorial may also further comprise a server to provide the tutorial page to the browser. The server also may be the file system serving facility of the browser. The interactive tutorial may be further provided with a user interactivity element to initiate the transfer by the data transfer element of the data to the software product. Also, the interactive tutorial may be provided wherein the browser is a conventional Web browser and operates contemporaneously with the software product. And, the interactive tutorial may also further comprise a configuration element to configure the tutorial page based on information in the software product through data transfer to the browser.

BRIEF DESCRIPTION OF THE DRAWINGS

The present invention is illustrated by way of example and not limitation in the figures of the accompanying drawings in which like references indicate similar or corresponding elements and in which.

DETAILED DESCRIPTION OF THE INVENTION

The present invention relates generally to tutorial systems for providing instruction in the operation of software products. Particularly, the invention pertains to a computer tutorial system wherein software product training is provided interactively by guiding the user, for example, through one or more examples or applications that can be created in and/or using the product. More particularly, the invention involves a computer implemented, interactive tutorial system providing online instruction in conjunction with a contemporaneously operating software product to, for example, create such examples or applications and the tutorial system further providing for the creation of such examples and applications in and/or using the product. Accordingly, a method, system and computer program product for providing an interactive tutorial is provided. More particularly, the method, system and computer program product of the present invention relates to providing an interactive tutorial that provides online instruction in conjunction with a contemporaneously operating software product and further provides for the creation of examples or applications in and/or using the product.

Interactive Tutorial Environment and Architecture

Figure 1:
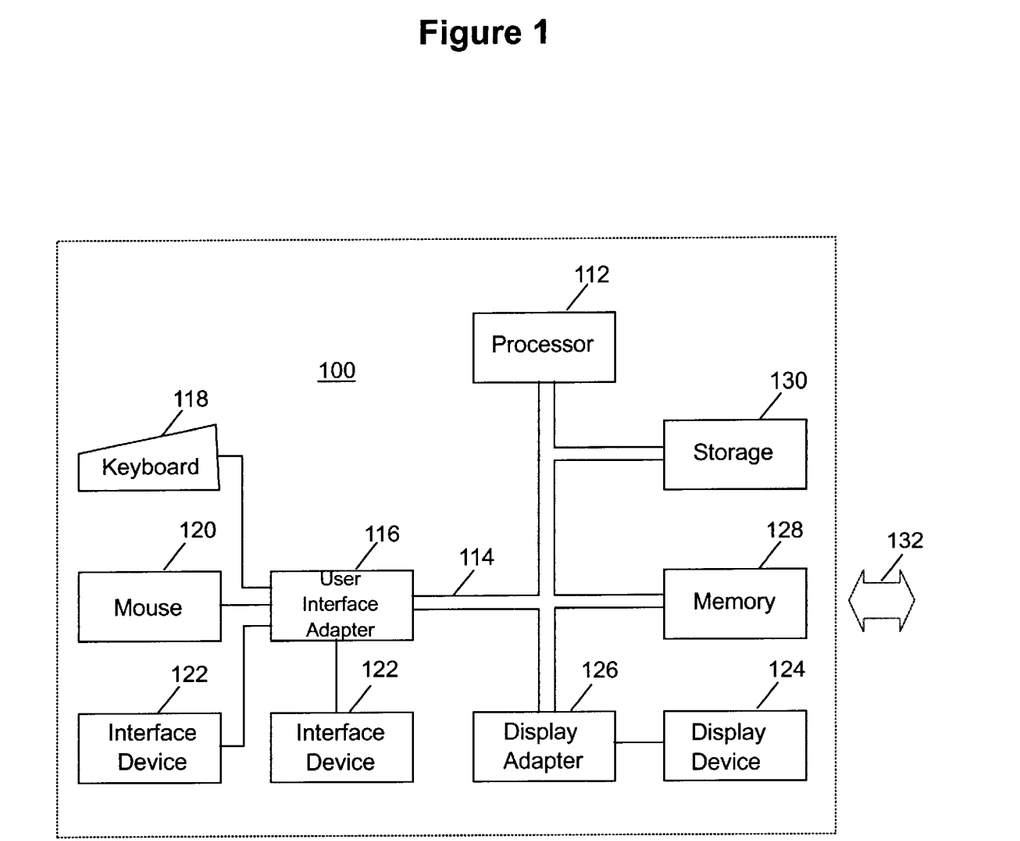
FIG. 1 is a block diagram of a computer workstation environment in which the present invention may be practiced.

FIG. 1 illustrates a representative computer hardware environment in which the present invention may be practiced. The environment of FIG. 1 comprises a representative single user computer workstation 100, such as a personal computer, including related peripheral devices. The workstation 100 includes a microprocessor 112 and a bus 114 employed to connect and enable communication between the microprocessor 112 and the components of the workstation 100 in accordance with known techniques. The workstation 100 typically includes a user interface adapter 116, which connects the microprocessor 112 via the bus 114 to one or more interface devices, such as a keyboard 118, mouse 120, and/or other interface devices 122, which can be any user interface device, such as a touch sensitive screen, digitized entry pad, etc. The bus 114 also connects a display device 124, such as an LCD screen or monitor, to the microprocessor 112 via a display adapter 126. The bus 114 also connects the microprocessor 112 to memory 128 and long-term storage 130 which can include a hard drive, diskette drive, tape drive, etc.

The workstation 100 may communicate with other computers or networks of computers, for example via a communications channel or modem 132. Alternatively, the workstation 100 may communicate using a wireless interface at 132, such as a CDPD (cellular digital packet data) card. The workstation 100 may be associated with such other computers in a local area network (LAN) or a wide area network (WAN), or the workstation 100 can be a client in a client/server arrangement with another computer, etc. All of these configurations and many variants thereof, as well as the appropriate communications hardware and software, are known in the art.

In the preferred embodiment, the tutorial of the present invention operates in the environment of a multitasking operating system running on the hardware environment of FIG. 1. The Microsoft Windows™ operating system is preferred. It provides a multitasking, graphical and windowing environment which allows the tutorial of the present invention to operate concurrently with one or more products to be learned. In this multitasking environment, lesson information can be presented in one portion of the display of the display device while the products can be displayed in another portion of that display. These display portions are conventionally known as windows. It would apparent to those skilled in the art that an operating system environment or one according to the specifications described above is not necessarily required.

Figure 2:
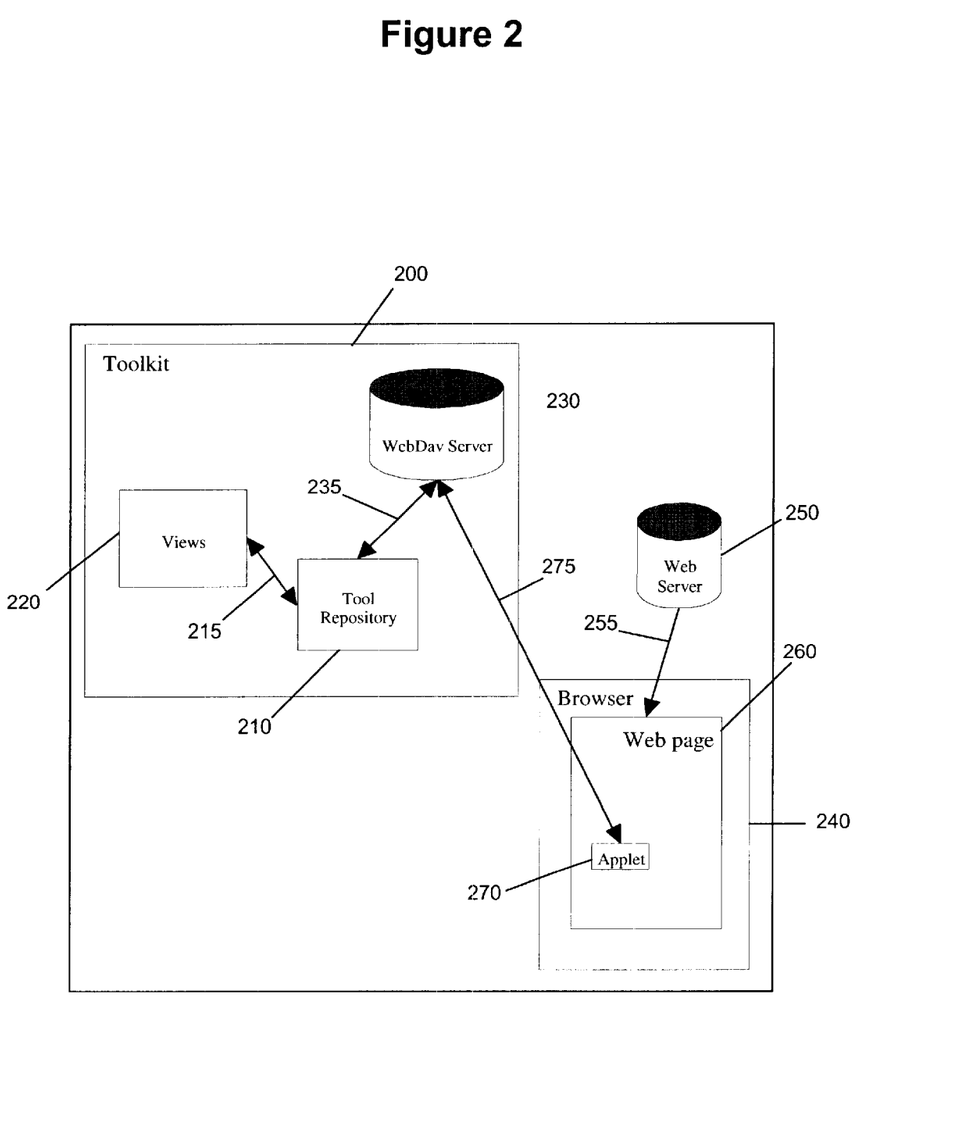
FIG. 2 is a schematic diagram of the architecture of the preferred embodiment of the present invention.

The architecture of the preferred embodiment of the invention as operable in the computer hardware and operating system environment of FIG. 1 is depicted in FIG. 2. In the preferred embodiment, the tutorial of the present invention is used to instruct the user on the operation of a software tool (product) for managing application message flows. Optionally, the tutorial could be used to instruct the user on the operation of other products (e.g. software application development tools) or be used to instruct the user on two or more products simultaneously. Referring then to FIG. 2, the tutorial of the present invention is shown in conjunction with such a software development tool or toolkit 200.

In the preferred embodiment, the tool comprises several elements relevant to the present invention. Of course to those skilled in the art, it would be apparent that a tool would comprise many more elements than as described hereafter. The first element is a tool repository 210. The tool repository is a store of information that is typically associated with an application (or example) being developed by the user in the toolkit. At the outset, such a tool repository may be initialized to contain only basic tool information to be associated with a user's application. Thereafter, the user causes information to be added to, deleted from or modified in the tool repository so as to form the user application. Such information can be added, deleted or amended in many ways: by user input (for example, whether by actual input of data through a keyboard or causing information to be created by the tool by the user establishing relationships in the tool), by the user selectively causing information to be "loaded" or imported into the repository, by the tool automatically, etc. And, in a preferred tool employing user interfaces, such tool repository stored information is presented to the user through toolkit views 220. The tool repository is typically (although not necessarily) an in-memory construct although persistence to, for example, a file system is typically provided.

Views 220 are simply the mechanisms for presenting 215 repository information to the user and for facilitating input 215 of new repository information into the repository from the user, through the tool's user interface (not shown). The first role of the views mechanism is to present the repository information to the user through the tool user interface. As is well-known in the art, there does not necessarily have to be correspondence between the information that is stored in the repository and the information presented to the user—repository information may be selectively presented to the user. Moreover, the user interface may simply be an abstraction of or other representation of the information in the tool repository. For example, the tool information stored in the repository may be represented in the user interface through the views mechanism as a graphical abstraction wherein graphical images correspond to data, code or artifacts represented by the information in the tool repository. In a second role of the views mechanism, the repository information may be amended, added or deleted typically by user interaction in the tool's user interface. As described above, repository information can be updated through user input, importing or loading of information, etc. Typically, when information in the tool repository is so amended, added or deleted, the views mechanism updates the information presented to the user through the user interface to reflect such changes.

In addition to the typical mechanisms of input into the tool repository outlined above, the tool of the preferred embodiment further comprises a WebDAV server. WebDAV is a network protocol for creating interoperable, collaborative applications, some of the major features of which are locking (long-duration exclusive and shared write locks to prevent overwriting), properties (XML properties for storage of arbitrary metadata, such as a list of authors, which can be efficiently set, deleted, and retrieved using the protocol), and namespace manipulation (support for copy and move operations of resources). Accordingly, a WebDAV server implements the WebDAV protocol in order to allow users and tools to take advantage of the features of the WebDAV protocol. In the context of the tool, the WebDAV server may be integrated with the tool or be provided on a stand-alone basis but with access to the tool and the tool repository. In the preferred embodiment, the WebDAV server is integrated with the tool.

In the tool of the preferred embodiment, the WebDAV server has read/write capability 235 on the tool repository such that it can retrieve information from the repository (often for further transmission) and write information to the repository (often received from a transmission to the WebDAV server). Accordingly, the WebDAV server facilitates to expose the application model in the tool's in-memory representation (repository) of that model. Indeed, the WebDAV server looks to the tool's repository just like the views mechanism of the tool for updating the repository information. While in the preferred embodiment a WebDAV server has been employed, it would be apparent to those skilled in the art that other mechanisms could provide similar functionality. Indeed, for example, an application programming interface with suitable implementing code could substitute for the WebDAV server. As will be described hereafter, the WebDAV server facilitates the operation of the tutorial of the present invention with the tool.

Interoperating directly or indirectly with the WebDAV server of the preferred embodiment are several components that comprise the tutorial aspect of the invention. Referring to FIG. 2, a browser 240 communicates with a Web server 250, the server providing 255 to the browser, for display to the user, one or more tutorial Web pages 260 and other machine readable instruction sets (not shown) comprising the user tutorial of the tool. In the preferred embodiment, the browser is a conventional browser such as the Netscape Navigator™ and Microsoft Explorer™ products and the tutorial page(s) are coded in hypertext markup language (HTML) and other conventional Web and Internet technologies such as Sun Microsystems Inc.'s Java™ and JavaScript™ languages and may comprise links to other code and data such as images, video, audio, data from databases, etc. However as would be apparent to those skilled in the art, other types of user interface mechanisms/browsers could be used such as a standard operating system window (available on most multitasking, graphical user interface operating systems such as Microsoft Windows) or customized viewing software configured to interoperate with the tool and implemented according to the present invention. Also, the browser aspect of the present invention may be integrated into the tool and/or form part of the tool's user interface. Similarly, different coding languages, such as XML and Sun Microsystems Inc. JavaServer Pages™, could be used for designing the tutorial page(s). Indeed, the tutorial pages could comprise the output of code created in traditional languages such C++ and BASIC, which output is sent to the browser (in the form of, for example, a standard operating system window or customized viewing software configured to interoperate with the tool and implemented according to the present invention) for display. Further, in the preferred embodiment, the browser is instantiated by user selection in the tool. By clicking on a tutorial item in a tool menu, the browser of the Navigator/Internet Explorer form may be started with the first (or only) tutorial page. In other optional embodiments, the click of a tutorial item in a tool menu could cause the browser to be made visible in the user interface of the tool where the browser is integrated with the tool or the browser in the form of a window or customized software could be instantiated.

In the preferred embodiment, tutorial pages are served from a local file system 250 where they are stored. The server 250 is located on the user's local or networked hardware environment or the HTML page retrieving capabilities from local file systems of typical browsers 250 could be employed. Optionally, the server for providing the tutorial page(s) may be on the Internet and the tool, the browser and the server are interconnected via communication channels. Accordingly, in such an optional embodiment, the tutorial page(s) may be served up to the browser from the server through conventional Internet protocols such as TCP/IP although other types of serving mechanisms could be used in place. Further, in the preferred embodiment, the browser via the action of an applet 270 written in the Java language communicates 275 tutorial information to and from the tool through connections with the WebDAV server. Through those connections, tool information can be updated in the tool repository via the WebDAV server's interface with the tool repository. Of course, there are numerous combinations of how information may be communicated and transported between the tool, the tutorial page(s) server and the browser and the invention should not be understood as so limited to the preferred embodiment. For example, communication to the tool may be available to the browser as well as the tutorial page(s) server. In another configuration, communication with the tool may be solely limited to the tutorial page(s) server and the browser may only retrieve information from and/or send information to the tutorial page(s) server. Also, any type of data transfer element can be used in place of the applet such as standard API messaging software, JavaScript code, servlets, Web browser plug-ins, hard-coded extensions to the browser itself, etc.

The content of the tutorial page(s), which page(s) comprises the user tutorial, would, for example, include instructions on how the tool operates or explain an example application that could be developed using the tool. As is conventional, if there is more than one tutorial page, the tutorial pages would be linked together so that the user could navigate through the tutorial pages. Additionally, the tutorial page(s) could provide links to other relevant information whether located elsewhere on the Internet or locally on the tutorial page(s) server. Such links could include HTML links to such information whether that information is in the form of another tutorial page, an audio file, a movie file or any other audiovisual work. Indeed such content could be selectively presented by the user clicking on such a link or could be provided automatically to the user upon the service of the tutorial page(s) to the browser.

The tutorial page(s) could further provide user interactivity features in the form of buttons, menus or other user input functionality and also provide other programmed functionality. Referring to FIG. 2, the applet associated with the tutorial page(s) is also in the preferred embodiment associated with a button on the tutorial page(s). When the button is clicked, the applet performs certain actions in conjunction with the browser which are described hereafter under the heading Operation and Features of the Interactive Tutorial. The tutorial page(s) could also have underlying programmed functionality in the form of, for example, common gateway interface (CGI) scripts, Java applets or servlets, and/or components according to the Sun Microsystems Inc. Enterprise JavaBeans™ specification. Such underlying programmed functionality could include, for example, interfacing to databases or other computer systems in order to present data in the tutorial page(s) from the database or other computer systems for viewing and updating. Accordingly, the applet of FIG. 2 could be extended to retrieve information from the WebDAV server for presentation on the tutorial page(s) or otherwise for processing in association with the tutorial page(s). Details of such functionality will described hereafter under the heading Operation and Features of the Interactive Tutorial.

In the preferred embodiment, the browser and tool user interfaces are provided in separate windows. It should be apparent to those skilled in the art that the browser and tool could be integrated, whether integrated, for example, from a code base viewpoint and/or integrated with respect to the user interface. Further, in the preferred embodiment, the browser and tool user interface may be tiled in the overall operating system user interface so that the user can see and/or interact with both the browser as well as the tool user interface. Again, as would be apparent to those skilled in the art, the browser and tool user interface may overlap each other in the overall operating system user interface or may only viewable in the user interface one at a time. In a similar manner, the browser as integrated into the tool user interface may be similarly tiled, overlapped or be separately viewable. Optionally, additional instances of the browser, whether as windows, views in the tool user interface, etc., may be created at the invocation or during the execution (e.g. by the user clicking on button) of a tutorial according to the present invention.

Operation and Features of the Interactive Tutorial

Figure 3:
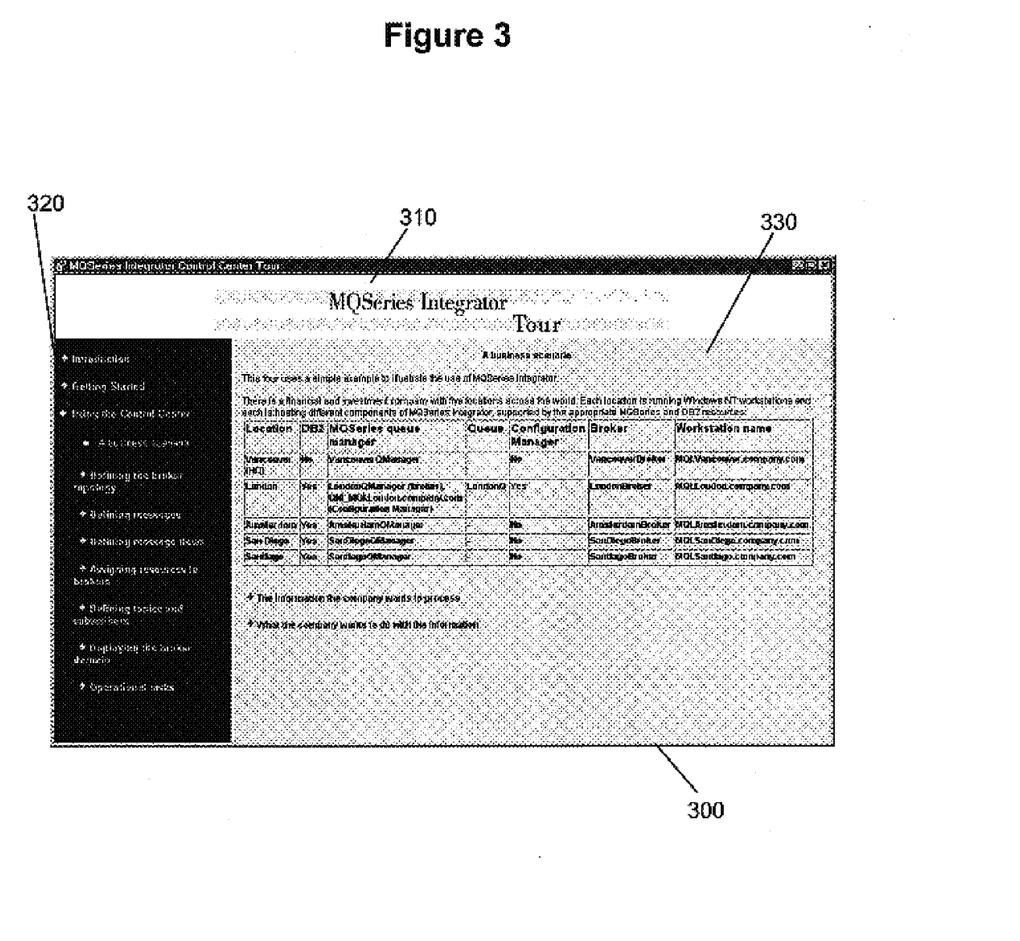
FIG. 3 is a screenshot depicting a screen in a preferred embodiment of the interactive tutorial of the present invention.

Referring to FIGS. 3 to 8, the operation and features of the interactive tutorial of the present invention is described hereafter. In FIG. 3, a tutorial page of an interactive tutorial developed for providing instruction in the use of a component of a software product known as IBM MQSeries™ Integrator is depicted.

Figure 4:
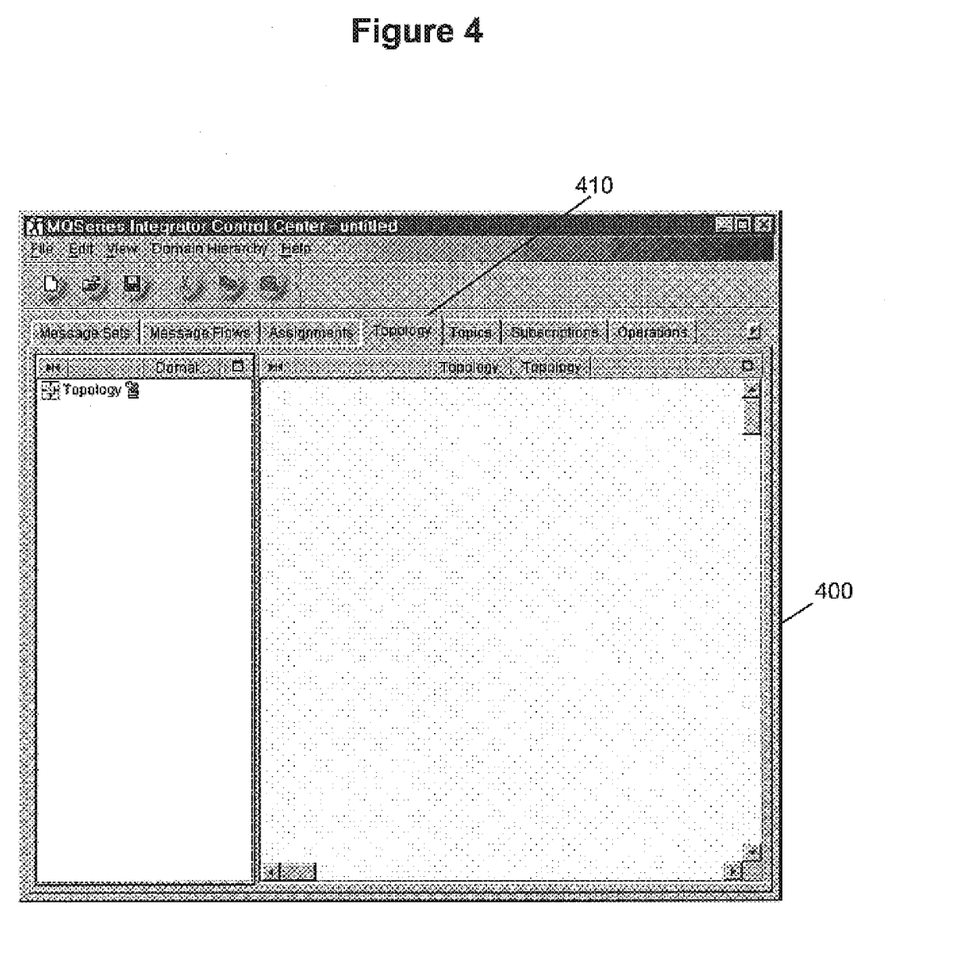
FIG. 4 is a screenshot depicting a screen of the tool operating in conjunction with the preferred embodiment of the interactive tutorial of the present invention.
Figure 6:
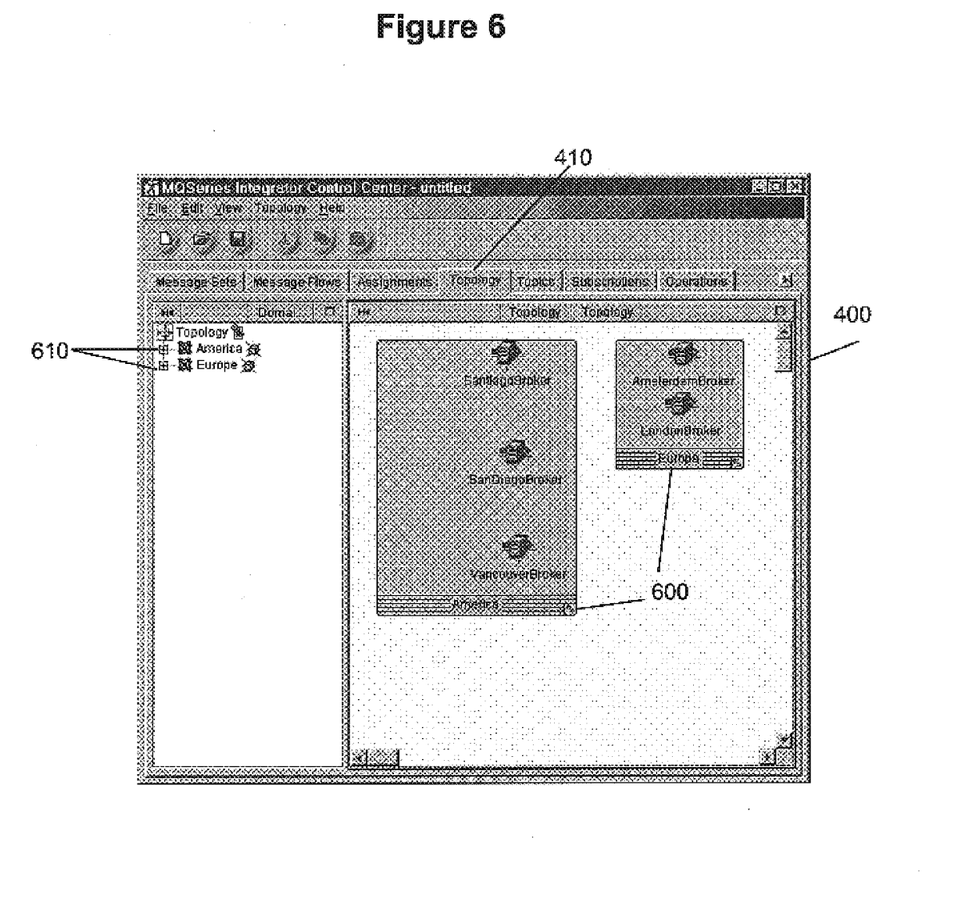
FIG. 6 is a screenshot depicting the screen of the tool of FIG. 4 after the button labeled "Create Definitions" has been activated by the user.

As described earlier, the preferred embodiment of the tutorial provides hands-on instruction for novice users on the operation and development of applications in a software tool for managing application message flows—MQSeries™ Integrator. MQSeries™ Integrator is a product that provides graphical tools for constructing how critical data or business events are handled, by visually connecting a sequence of processing function to dynamically manipulate and route messages, combine them with data from corporate databases, warehouse in-flight message data for auditing or subsequent analysis, and distribute information efficiently to business applications. FIGS. 4 and 6 depict screenshots of the graphical user interface of the MQSeries Integrator Control Center component of that product.

Returning to FIG. 3, the browser 300 of the present invention with a tutorial page 310 from a tutorial that provides a "tour" of the MQSeries™ Integrator product is depicted. Along the left-hand side of the page, a menu 320 is provided with several sub-menu headings marked with right-hand pointing arrows e.g. "Introduction" and "Getting Started". By clicking on the text or arrow of each such sub-menu heading, the browser is refreshed (either with a new tutorial page or an update to the portion(s) (or frame(s)) of the tutorial page requiring update as a result of the clicking action) with a view showing further content of that sub-menu below the sub-menu heading. In FIG. 3, the sub-menu heading "Using the Control Center" has been clicked to reveal further sub-menu content including further sub-menu headings (designated with arrows). Subsequently should the user want to "hide" the sub-menu content, the user could so by clicking on the "Using the Control Center" heading. Underneath the "Using the Control Center" heading, there is also provided a heading simply titled "A business scenario" along with a filled-in circle. The filled-in circle simply indicates that this heading is not for a sub-menu and, in this case, this heading is simply a title associated with the content on the rest of the page.

On the right-hand side of the page, an instruction area 330 provides the user with relevant instructional material. In the example tutorial page of FIG. 3, there is provided instruction appurtenant to the title "A business scenario", content that was presented to the user when the "Using the Control Center" sub-menu was "opened". Further sub-menu headings are provided in the instruction area, namely "The information the company wants to process" and "What the company wants to do with the information", which can be selectively "opened" (and "closed") by the user.

So, by clicking headings (marked with right-pointing arrows) to "open" and "close" menus and exposing content in the instruction area, the user can freely move through the tutorial. In a preferred manner, the user would, as guided by the text and overall layout of the tutorial, open the sub-menus in a top-to-down manner and similarly explore sub-menus there below in a top-to-down manner. However, the tutorial is not so constrained and the user can "move" around in the tutorial however chosen. As would be apparent to those skilled in the art, the tutorial can be structured any number of different ways and the invention should not be considered so limited. For example, each tutorial page may be simply linked to each other and "Back" and "Forward" buttons can be used to help in navigating through the links with certain links, buttons, etc. perhaps instantiating a new browser to display tutorial content.

Figure 5:
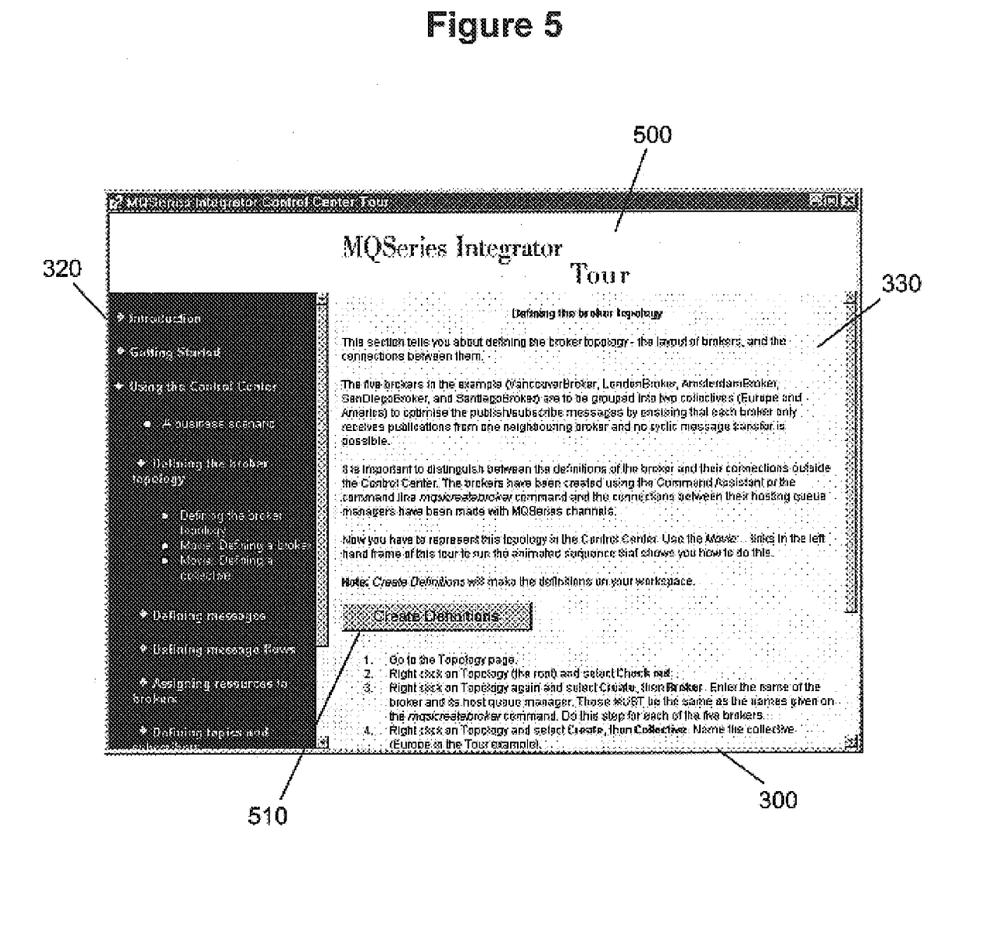
FIG. 5 is a screenshot depicting a screen in a preferred embodiment of the interactive tutorial of the present invention providing the user a button labeled "Create Definitions" for causing the creation of the definitions as described in the tutorial.

Now referring to FIG. 4, the user interface 400 of the MQSeries™ Integrator Control Center product (or tool) is depicted. It is for this tool that the interactive tutorial depicted in FIGS. 3 and 5 provides instruction. In FIG. 4, an initial state of the tool is shown with a "Topology" tab 410 shown in the foreground. The "Topology" tab of the tool provides the user with information on the topology of brokers in a network and facilitates the user to define the brokers and their interrelationship. The tool's repository has only initial information; no additional information has been added, deleted or modified by the user or otherwise. The views mechanism of the tool (not shown) provides the liaison between the user interface depicted here and the tool's repository. Should information be updated in the repository, the views mechanism would facilitate the presentation (as appropriate) to the user through the tool's user interface, depending on the configuration of the views mechanism, any added, deleted or modified information in the repository.

FIG. 4 is provided for context with FIG. 6 in light of the tutorial page shown in FIG. 5 described hereafter.

In FIG. 5, the browser 300 of the present invention with another tutorial page 500 for the MQSeries™ Integrator product is depicted. In this case, the sub-menu heading "Defining the broker topology" in the menu 320 has been "opened" to reveal further headings, which in this case are not sub-menu headings as indicated by the filled-in circles. The first heading relates to the content in the instruction area while the next two headings are prefaced "Movie". The "Movie" heading as suggested by their titles are links to movies depicting the user interface operations necessary to perform the actions described after the colon in the heading. The first movie provides a depiction of the steps required in the user interface of the tool of FIG. 4 to perform the steps of defining a broker—the first steps for defining a broker topology as described in the instruction area. The second movie provides a depiction of the steps required in the user interface of the tool of FIG. 4 to perform the steps of defining a collective—the second aspect of defining a broker topology as described in the instruction area. Combined, the two movies provide the user graphical instruction of what button presses, menu actions, mouse movements, etc. are required to replicate the instructions of the tutorial page in FIG. 5.

In the instruction area, content has been provided appurtenant to the "Defining the broker topology" heading. Appropriately so titled, the content provides instruction on how to define a broker topology, which instruction is also depicted in movie instruction form in the menu as described earlier. As the content indicates, the instruction is relevant to the "Topology" page of the tool—in other words, the "Topology" tab shown in the foreground of FIG. 4. The tutorial page of FIG. 5 also provides an element—a push button 510—not shown earlier in FIG. 3.

The push button labeled "Create Definitions" allows the user to actually create the definitions described in the instructions in the tool itself. Upon the user pressing the button, the tutorial, as explained hereafter, supplies definitions data to the tool and the tool's repository in order to setup the definitions, as described in the instructions, in the tool. The views mechanism of the tool thereafter facilitates the presentation of appropriate information to the tool user interface to represent the information corresponding to the definitions data added to, deleted from or modified in the repository.

Referring to FIG. 6, the results as "reported" by the views mechanism to the tool user interface 400 of the updating of the tool repository information caused by the user clicking on the push button 510 in FIG. 5 is shown. As per the instructions of the tutorial page of FIG. 5, five brokers (SantiagoBroker, SanDiegoBroker, VancouverBroker, AmsterdamBroker and LondonBroker) have been defined along with two collectives (America and Europe) to group them. Not only are the two collectives shown graphically 600 in the right-hand panel of the "Topology" tab 410 but they are also shown as rungs 610 in the left-hand panel of the "Topology" tab. The "+" sing next to each rung indicates that they can be "opened" to reveal the brokers they contain (not shown).

Figure 7:
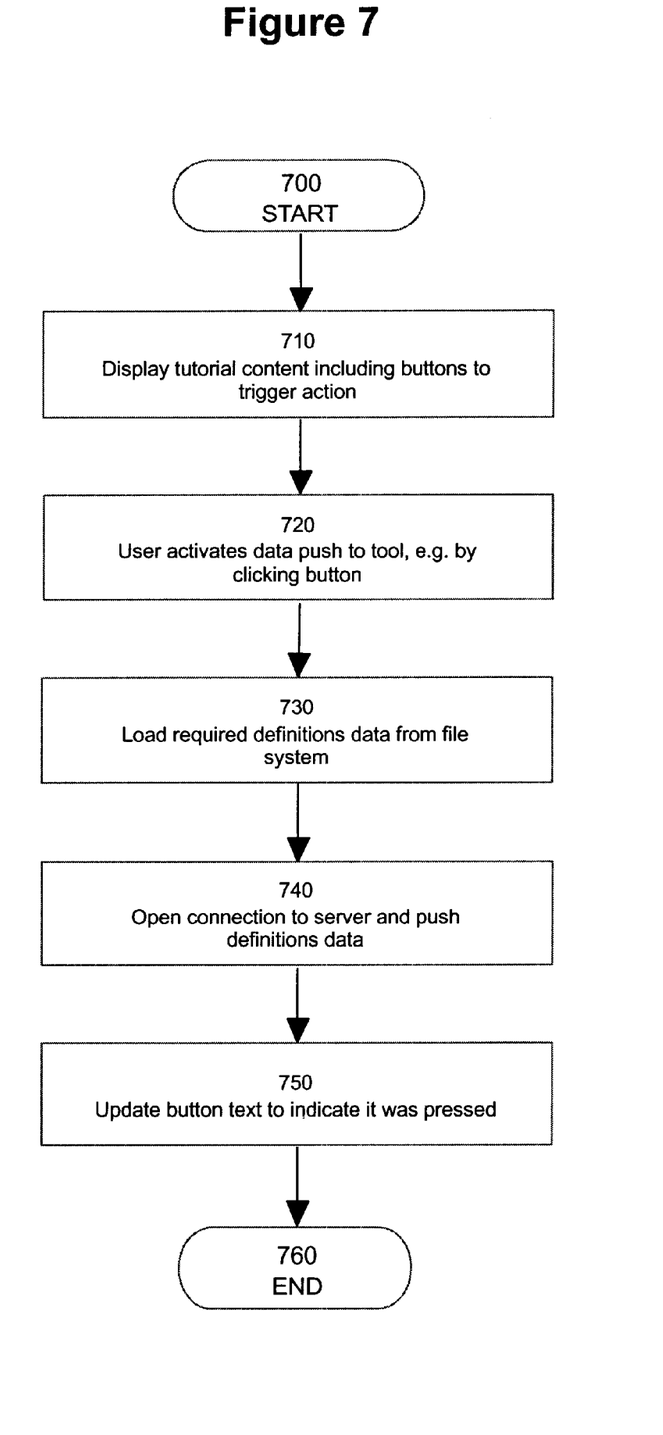
FIG. 7 is a flowchart of the operation of the interactive tutorial of the present invention.

A flowchart outlining the steps involved in causing the updating of the tool's repository through the interactive tutorial of the present invention in accordance with the tutorial example of FIGS. 3 to 6 is shown in FIG. 7. At the outset 700, the interactive tutorial displays the relevant instructional content associated with the example or application (or part thereof) that the tutorial will facilitate implementing in the tool, together typically with an associated button or other user interactivity element which allows the user to initiate the creation of the example or application (or part thereof). In the preferred embodiment, the tutorial uses a push button in a tutorial page as shown in FIG. 5. It should be apparent to those skilled in the art that other user interactivity devices could be used such as menus and/or that the user interactivity element need not necessarily be provided in the tutorial page but could rather be located in the browser itself as, for example, a menu item.

The user then typically activates the data push to the tool and the tool repository through the user interactivity element 720. In the preferred embodiment, this involves the user clicking, for example, the push button of FIG. 5. It should be apparent to those skilled in the art that the data push to the tool and the tool repository may be initiated other than by the user. For example, the tutorial may automatically initiate the data push on the occurrence of an event such as the elapse of a predetermined time interval, upon the serving of a certain tutorial page (or portion thereof) to the browser or the occurrence of something in the tool. Similarly, the user selective data push can be initiated by other than the user clicking on a push button. For example, the user may initiate the data push by selecting a menu item or by any other activation means known now or hereafter.

The activation of the data push causes a load of the required definitions data for the tool from the relevant file system in order that the definitions data may be communicated to the tool 730 for, in most cases, ultimate storage in the tool's repository. In the preferred embodiment, referring to FIG. 2, this step involves execution of the applet 270 and the applet retrieving 255 the definitions data from the tutorial page(s) server 250. Alternatively, the definitions data may have been loaded when the tutorial page(s) was first served to the browser. Further, in alternative configurations, it may be the WebDAV server that issues a command to retrieve the definitions data from the tutorial page(s) server or from the tool's local file system.

Once the definitions data is loaded, a connection is opened 740, in the preferred embodiment, between the applet/browser and the WebDAV server of the tool wherein the applet/browser is the "client" of the WebDAV server. As indicated earlier, in an alternative embodiment, the connection could be made, for example, between the WebDAV server and the tutorial page(s) server. Or should some alternative implementation be used other than a WebDAV server, such as an API, then a messaging session could be established.

Once loaded, the definitions data is sent 740 to the WebDAV server in a format in accordance with the Web-DAV protocol. As indicated earlier for an alternative embodiment, if the WebDAV server has responsibility for obtaining the definitions data, the definitions data would instead be sent to the WebDAV server from the tutorial page(s) server or from the tool's local file system according to the WebDAV protocol. Should an API have been used, the definitions data would be communicated, for example, according to the API's messaging format. When the definition data is received by the WebDAV server, the data is processed by the WebDAV server and selectively stored in the tool's repository as described hereafter. If and when changes are made in the tool's repository information, the changes are reflected as appropriate in the user interface of the tool using the standard notification scheme of the tool repository to the views mechanism of the tool. Consequently, as the user interface views of the tool change, the user sees the results of the tutorial in the tool. This allows the user to "walk" through a tutorial scenario. When the scenario is completed, the user has a completed example or application (or part thereof identical to that which would have been created through independent user interactions with the tool.

Once the definitions data is pushed to the tool, the tutorial system in the preferred embodiment updates the tutorial page(s) to indicate the action was completed 750. In the case of the push button of the example in FIG. 5, the browser user interface would indicate that the push button had been pressed. Selectively, the user would be able to view the tool's user interface and in most cases, view the results of these actions as shown in FIG. 6.

Figure 8:
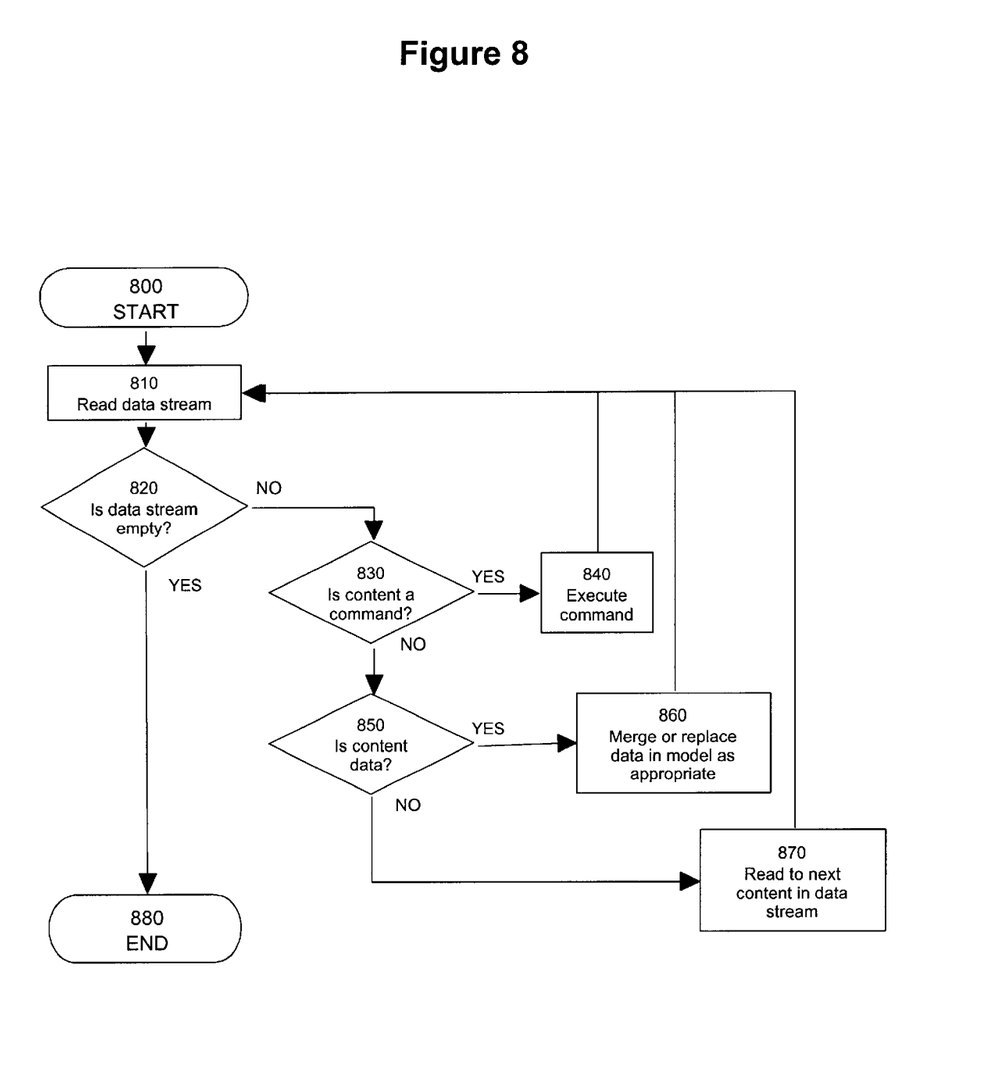
FIG. 8 is a flowchart of the operation of the tool operating in conjunction with the interactive tutorial of the present invention.

Referring to FIG. 8, the steps involved in the receipt by the tool of the definitions data of the example of FIGS. 3 to 6 is shown in flowchart format. Through these steps, the definitions data is interpreted by the WebDAV server and tool and, as appropriate, updates are made to the tool's repository.

Once the definitions data is received by the WebDAV server (and so the tool), the definitions data stream is read by the WebDAV server 810. If the data stream is empty, the data stream analysis process is ended 880 and optionally, an error condition or notice is sent to the tutorial system (the applet/browser in the preferred system) for processing.

If the data stream is not empty, content from that data stream is analyzed. If the content is a command 830, then the WebDAV server instructs the tool to execute the command 840. Of course, checks may be in place in the WebDAV server to screen out or modify certain commands depending on the type of command, the repository state, etc. Similarly, the tool itself may limit the executing of certain commands also based on the type of command, the repository state, ownership of necessary locks, etc. Further, error checking mechanism may be put in place to ensure the command is properly sent to the tool for execution and is properly executed by the tool with, optionally, a error message being sent to the tutorial system for display and/or processing. These safeguards in combination allow for a great deal of flexibility in the tutorial. The user can "move" around the tutorial as desired and whenever a button in the tutorial page(s) is pressed to cause the tutorial system to create an example or application (or part hereof) in the tool, the WebDAV server, in combination with the functionality of the tutorial system as required, will ensure that the actions can be performed without error through the normal WebDAV functions such as locking and name conflict checking or through other optional extensions.

If the content is data 850, the WebDAV server instructs the tool to merge or replace information in the tool repository in accordance with that data 860. The WebDAV server may employ standard locking and name conflict checking to properly process the data into the tool repository. For example, if a user has already created information in the tool repository with the same name as would be used by the definitions data supplied by the tutorial system, the WebDAV server will resolve such conflicts according to a pre-configured or user configurable scheme. The WebDAV server could, for example, issue a notice to the user that information with the same name already exists in the tool and perhaps suggest a different name to the user. Accordingly, the WebDAV server would prevent rote overwrites and avoid unexpected error conditions that may result from such overwrites. And like with respect to commands, flexibility of "moving" through the tutorial is enhanced through the integrity mechanisms of the WebDAV server.

If the content is neither data nor a command, the next content in the data stream is read 870. After reading the data stream 810, the data stream as described above is analyzed for whether it is empty 820. In this cyclical manner, the data stream to the WebDAV server (and tool) of the definitions data is processed for execution by the tool and for storage into the tool repository. Once (or as) the information is in the tool repository, the views mechanism as described above makes the relevant repository information to the user in the tool's user interface.

The tutorial of the present invention may also be configured or reconfigured based on the state or other information in the tool and tool's repository through data sent from the WebDAV serve to the tutorial system. For example, messages from the WebDAV server to the tutorial system may indicate that certain example or application components already exist in the tool's repository. Such information may be used by the tutorial system to configure the tutorial page(s) to indicate to the user that those components have already been created or else block the user from executing the example or application creating functionality in the tutorial by, for example, disabling buttons in the tutorial page(s). Moreover, the understanding by the tutorial system of the state of the tool could be used to determine where a user discontinued a previous tutorial and used consequently to configure the tutorial to begin where the user "left off" in the previous tutorial.

Further, the information stored in the tool and the tool repository may be integrated into the tutorial page(s) or otherwise analyzed by the tutorial system in order to configure the tutorial. For example, preexisting data in the tool repository may be used by the tutorial system to modify the names or definitions of example or application objects provided in the tutorial so that the tutorial (and the resulting example or application in the tool) could be tailored to the preexisting information in the tool and tool repository. In the preferred embodiment, the tutorial system employs JavaScript code to analyze the returned data and to dynamically configure the tutorial. It should be apparent to those in the art that there are many different ways of providing such functionality whether using different languages, different code implementations, etc.

Optionally, the tutorial of the present invention may be enhanced with other functionality well-known in the art. For example, the tutorial of the present invention may be extended with monitoring functionality to ensure that user interactions within the tool conform to or align with the tutorial objectives and constraints. Such functionality could be added as instructions stored on the tutorial page(s) server and used to instruct a suitably extended WebDAV server in the tool to control the operation of the tool and the information in the tool's repository. Similarly, the tutorial of the present invention may be extended with demonstration assistance functionality. Such functionality would instruct the user on how to operate the tool's user interface in order to effect the example or instruction described in the tutorial by graphically or otherwise showing in the actual tool's user interface what buttons, commands, menus, etc. must be used to effect certain actions. Like with monitoring functionality, the demonstration assistance could be added as instructions stored on the tutorial page(s) server and used to instruct a suitably extended WebDAV server in the tool to effect demonstration (by, for example, movement of the mouse cursor in the tool's user interface) of what buttons, menus, mouse movements, etc. must be used to effect the tutorial example or instructions. Alternatively, such demonstration could be done by various standard operating systems calls. In the preferred embodiment, such demonstration assistance is provided in the form of a movie demonstrating what button, menus, mouse movements, etc. must be used to effect the tutorial example or instructions (see FIG. 5).

The detailed descriptions may have been presented in terms of program procedures executed on a computer or network of computers. These procedural descriptions and representations are the means used by those skilled in the art to most effectively convey the substance of their work to others skilled in the art. They may be implemented in hardware or software, or a combination of the two.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, objects, attributes or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or similar devices.

Each step of the method may be executed on any general computer, such as a mainframe computer, personal computer or the like and pursuant to one or more, or a part of one or more, program modules or objects generated from any programming language, such as C++, Java, Fortran or the like. And still further, each step, or a file or object or the like implementing each step, may be executed by special purpose hardware or a circuit module designed for that purpose.

In the case of diagrams depicted herein, they are provided by way of example. There may be variations to these diagrams or the steps (or operations) described herein without departing from the spirit of the invention. For instance, in certain cases, the steps may be performed in differing order, or steps maybe added, deleted or modified. All of these variations are considered to comprise part of the present invention as recited in the appended claims.

While the description herein may refer to interactions with a user interface by way of, for example, computer mouse operation, it will be understood that within the present invention the software developer is provided with the ability to interact with these graphical representations by any known computer interface mechanisms, including without limitation pointing devices such as computer mouses or trackballs, joysticks, touch screen or light pen implementations or by voice recognition interaction with the computer system.

While the preferred embodiment of this invention has been implemented using Sun Microsystems' Java JavaScript™ language, this invention need not be solely implemented using the Java or JavaScript languages. It will be apparent to those skilled in the art that the invention may equally be implemented in other computer languages, such as object oriented languages like C++.

The invention is preferably implemented in a high level procedural or object-oriented programming language to communicate with a computer. However, the invention can be implemented in assembly or machine language, if desired. In any case, the language may be a compiled or interpreted language.

While aspects of the invention relate to certain computer language and other technological specifications (e.g. the WebDAV specifications (HTTP Extensions for Distributed Authoring—WEBDAV—IETF Request for Comments 2518) with respect to the WebDAV protocol), it should be apparent that classes, objects, components and other such software and technological items referenced herein need not fully conform to the specification(s) defined therefor but rather may meet only some of the specification requirements. Moreover, the classes, objects, components and other such software and technological items referenced herein may be defined according to equivalent specification(s) other than as indicated herein that provides equivalent or similar functionality, constraints, etc. For example, instead of the JavaScript specification, classes, objects, components and other such software and technological items referenced herein may be defined according to Microsoft Corporation's ActiveX™ specification where applicable and appropriate.

The invention may be implemented as an article of manufacture comprising a computer usable medium having computer readable program code means therein for executing the method steps of the invention, a program storage device readable by a machine, tangibly embodying a program of instructions executable by a machine to perform the method steps of the invention, or a computer program product. Such an article of manufacture, program storage device or computer program product may include, but is not limited to, CD-ROMs, diskettes, tapes, hard drives, computer RAM or ROM and/or the electronic, magnetic, optical, biological or other similar embodiment of the program. Indeed, the article of manufacture, program storage device or computer program product may include any solid or fluid transmission medium, magnetic or optical, or the like, for storing or transmitting signals readable by a machine for controlling the operation of a general or special purpose programmable computer according to the method of the invention and/or to structure its components in accordance with a system of the invention.

The invention may also be implemented in a system. A system may comprise a computer that includes a processor and a memory device and optionally, a storage device, an output device such as a video display and/or an input device such as a keyboard or computer mouse. Moreover, a system may comprise an interconnected network of computers. Computers may equally be in stand-alone form (such as the traditional desktop personal computer) or integrated into another apparatus (such a cellular telephone). The system may be specially constructed for the required purposes to perform, for example, the method steps of the invention or it may comprise one or more general purpose computers as selectively activated or reconfigured by a computer program in accordance with the teachings herein stored in the computer(s). The procedures presented herein are not inherently related to a particular computer system or other apparatus. The required structure for a variety of these systems will appear from the description given.

While this invention has been described in relation to preferred embodiments, it will be understood by those skilled in the art that changes in the details of construction, arrangement of parts, compositions, processes, structures and materials selection may be made without departing from the spirit and scope of this invention. Many modifications and variations are possible in light of the above teaching. Thus, it should be understood that the above described embodiments have been provided by way of example rather than as a limitation and that the specification and drawing(s) are, accordingly, to be regarded in an illustrative rather than a restrictive sense.

The embodiments of the invention in which an exclusive property or privilege is claimed are defined as follows:

1. A method for providing an interactive tutorial of a software product comprising the steps of:
   presenting tutorial content relating to the software product through a tutorial system; initiating a transfer of data to the software product, the data being associated with the tutorial and defining an application of the software product; transferring the data from the tutorial system to the software product upon the initiation of the data transfer;
   processing of the data in the software product to generate the application of the software product defined by the data; and
   presenting a representation of the generated application through the software product.

2. The method of claim 1 further comprising the step of providing a user interactivity element for initiating a transfer of the data and wherein initiating a transfer of the data is caused through activation of the user interactivity element.

3. The method of claim 2 wherein the user interactivity element is a push button and activation of the user interactivity element comprises clicking the push button.

4. The method of claim 1 wherein the step of initiating a transfer of data to the software product comprises loading the data and establishing a connection with the software product.

5. The method of claim 4 wherein the software product comprises a WebDAV server and the connection is according to WebDAV protocol.

6. The method of claim 4 wherein the loading is done by an applet.

7. The method of claim 5 wherein the step of processing of the data in the software product comprises receipt by the WebDAV server of the data and processing of the data by the WebDAV server for execution of commands and updating of information in the software product.

8. The method of any one of claims 1 to 7 wherein the software product is a software application development product and the data defines a software application developed in the software application development product.

9. The method of any one of claims 1 to 7 further comprising the step of configuring the tutorial content based on information in the software product through data transfer to the tutorial system and wherein the software product is a software application development product and the data defines a software application developed in the software application development product.

10. A computer program product in a computer readable medium, comprising computer readable program code means therein for providing an interactive tutorial of a software product, the computer readable program code means in said computer program product comprising:
    computer readable code means for presenting tutorial content relating to the software product through a tutorial system;
    computer readable code means for initiating a transfer of data to the software product, the data being associated with the tutorial and defining an application of the software product;
    computer readable code means for transferring the data from the tutorial system to the software product upon the initiation of the data transfer;
    computer readable code means for processing of the data in the software product to generate the application of the software product defined by the data; and
    computer readable code means for presenting a representation of the generated application through the software product.

11. The computer program product of claim 10 further comprising computer readable code means for providing a user interactivity element for initiating a transfer of the data and wherein the computer readable code means for Initiating a transfer of the data is started through activation of the user interactivity element.

12. The computer program product of claim 11 wherein the user interactivity element is a push button and activation of the user interactivity element comprises clicking the push button.

13. The computer program product of claim 10 wherein the computer readable code means for initiating a transfer of data to the software product comprises computer readable code means for loading the data and establishing a connection with the software product.

14. The computer program product of claim 13 wherein the software product comprises a WebDAV server and the connection is according to WebDAV protocol.

15. The computer program product of claim 14 wherein the loading is done by an applet.

16. The computer program product of claim 14 wherein the computer readable code means for processing of the data in the software product comprises computer readable code means for receipt by the WebDAV server of the data and computer readable code means for processing of the data by the WebDAV server for execution of commands and updating of information in the software product.

17. The computer program product of any one of claims 10 to 16 wherein the software product is a software application development product and the data defines a software application developed in the software application development product.

18. The computer program product of any one of claims 10 to 16 further comprising computer readable code means for configuring the tutorial content based on information in the software product through data transfer to the tutorial system and wherein the software product is a software application development product and the data defines a software application developed in the software application development product.

19. A computer system for providing an interactive tutorial of a software product comprising:

means for presenting tutorial content relating to the software product through a tutorial system;

means for initiating a transfer of data to the software product, the data being associated with the tutorial and defining an application of the software product; means for transferring the data from the tutorial system to the software product upon the initiation of the data transfer;

means for processing of the data in the software product to generate the application of the software product defined by the data; and means for presenting a representation of the generated application through the software product.

20. The computer system of claim 19 wherein the means for initiating a transfer of data to the software product comprises means for loading the data and establishing a connection with the software product.

21. The computer system of claim 20 wherein the software product comprises a WebDAV server, the loading is done by an applet and the connection is according to the WebDAV protocol.

\* \* \* \* \*